No. 783,916. Patented February 28, 1905.

UNITED STATES PATENT OFFICE.

GEORG VON WIRKNER, OF SCHALKE, GERMANY.

PROCESS OF MANUFACTURING PITCH.

SPECIFICATION forming part of Letters Patent No. 783,916, dated February 28, 1905.

Application filed June 22, 1903. Serial No. 162,590.

*To all whom it may concern:*

Be it known that I, GEORG VON WIRKNER, doctor of philosophy, a subject of the Emperor of Austria-Hungary, residing at Schalke, Westphalia, Germany, (whose post-office address is Fabrikdirector Dr. Georg von Wirkner, Schalke, Westphalia, Germany,) have invented a certain new and useful Process for the Manufacture of Pitch, (for which I have applied for a patent in Germany on the 7th day of March, 1903,) of which the following is a specification.

It is well known that the affinity of sulfuric acid to water is so great that the acid abstracts from many substances hydrogen and oxygen while forming water. According to the present invention these properties of sulfuric acid are utilized for the conversion of tar, tar-oils, and similar matters into pitch. The details of procedure in ordinary cases may be as follows: The raw material to be converted into pitch is heated with a quantity of sulfuric acid to be ascertained by a preliminary experiment, carried out as follows: A test sample of the raw material is heated with about ten per cent. of sulfuric acid in a small receptacle to about 180° or higher. If the result is not satisfactory as regards the yield and the desired consistency, the experiment is repeated with a slightly larger quantity of acid. If this experiment does not give a satisfactory result, a third experiment is made with a still larger quantity of acid, and so on until the quantity of acid required has been ascertained. The acid is added to the raw material in the cold or caused to flow into the preheated raw material at once or gradually, and the heating of the mixture is continued until the sulfuric acid has been decomposed and until any volatile substances which may have remained undecomposed or which may have split off in the course of the reaction have been distilled off sufficiently to leave a residue of the desired consistency or thickness. For this purpose any known operations hitherto used, for instance, in the distillation of coal-tar, for distilling the tar down to the consistency of pitch may of course find appropriate application in carrying out my present invention.

The strength of the sulfuric acid used is immaterial for the result of the reaction, because in using dilute sulfuric acid the excess of water will be evaporated and the acid concentrated by the heat employed in the process. As a rule it will be found advantageous to use concentrated acid.

Owing to the great variation in the composition of the raw materials suitable for treatment by the present process no definite or accurate rule can be given as regards the quantity of sulfuric acid required in each case and as regards the quantity of heat or the temperature to be maintained, except that the temperature should be about 180° centigrade or higher. As mentioned above, these proportions or requirements have to be ascertained for each particular raw material to be employed by means of a preliminary experiment. These conditions depend also in a great measure on the nature of the final product to be obtained—that is to say, whether soft, medium soft, or hard pitch is required.

By the present process tar, tar-oils, and similar material may be easily converted into pitch.

The following examples have given good results:

First. Three hundred parts of tar-oil (anthracene-oil) having a specific gravity of 1.120 to 1.125 were mixed with one hundred and two to one hundred and eight parts of sulfuric acid of 60° Baumé and gradually heated to a temperature approaching 300° centigrade. The water split off the oil or introduced with the acid escapes first, while producing violent ebullition. At the same time the generation of sulfurous acid becomes noticeable and continues to the end of the reaction, which moment may, as a rule, be recognized by the frothing of the residue; but the surest way of recognizing the end of the process is to test samples taken from the residue by introducing a drop of the same into cold water and examining the hardness or consistency of the product thus obtained. The approximate duration of the process is from one and one-half to two hours.

Second. Three hundred parts of coal-tar are heated to about 180° to 200° centigrade, thereby causing the water contained in the tar and the corresponding light oils to escape. Subsequently about thirty parts of sulfuric acid of 60° Baumé are caused to flow into the oil, and the heating is continued until the desired consistency has been attained.

The present process affords a simple and cheap substitute for the usual distillation process of obtaining pitch from tar and certain tar products or similar raw materials, and the product thus obtained has a higher market value and is more salable.

It has been previously proposed to treat tar with sulfuric acid in the cold or at a moderate heat in order to produce pitch; but the result of this treatment is only an intermediate product, which is afterward subjected to a complicated supplemental treatment with a comminuted metal in the presence of water for the purpose of neutralizing the sulfuric acid, which is subsequently washed out in the shape of a sulfate, after which the product has to be distilled until it possesses sufficient hardness. In my process the product obtained by heating the raw material with sulfuric acid immediately yields the final product. It is free from sulfuric acid, because the sulfuric acid has been removed in the course of the process by complete decomposition, and the product is not subjected to any supplemental treatment.

What I claim is—

1. The process for obtaining pitch from tar-oils and similar materials, which consists in heating the same with a suitable quantity of sulfuric acid to a temperature of about 180° centigrade at least, until the sulfuric acid is decomposed and a sufficient quantity of the volatile bodies has been distilled off to leave a pitch of the desired consistency, substantially as described.

2. The process of obtaining pitch from tar-oils and similar materials, which consists in heating the same with a desired quantity of sulfuric acid until the said acid decomposes, and a sufficient quantity of the volatile bodies has been distilled off to leave pitch of the desired consistency.

In witness whereof I have hereunto signed my name in the presence of two subscribing witnesses.

GEORG VON WIRKNER.

Witnesses:
MARCELL FELTEN,
VICTOR SCHWANDNER.